US012284500B2

(12) United States Patent
Wilberding et al.

(10) Patent No.: US 12,284,500 B2
(45) **Date of Patent: *Apr. 22, 2025**

(54) SYSTEMS AND METHODS FOR COORDINATED PLAYBACK OF ANALOG AND DIGITAL MEDIA CONTENT

(71) Applicant: Sonos, Inc., Santa Barbara, CA (US)

(72) Inventors: Dayn Wilberding, Portland, OR (US); Dana Krieger, Emeryville, CA (US); Daniel Jones, London (GB); Gregory McAllister, London (GB); Ryan Purdy, Santa Barbara, CA (US); Adam Kumpf, Delware (CA); Russell Prince, Madison, WI (US); Ed Krouse, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,856

(22) Filed: May 6, 2024

(65) Prior Publication Data

US 2024/0323606 A1 Sep. 26, 2024

Related U.S. Application Data

(63) Continuation of application No. 17/808,169, filed on Jun. 22, 2022, now Pat. No. 12,010,492.

(Continued)

(51) Int. Cl.
*H04R 3/12* (2006.01)
*H04R 27/00* (2006.01)

(52) U.S. Cl.
CPC ............... *H04R 3/12* (2013.01); *H04R 27/00* (2013.01); *H04R 2227/005* (2013.01); *H04R 2420/07* (2013.01)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| | | | |
|---|---|---|---|
| EP | 1389853 | A1 | 2/2004 |
| WO | 200153994 | | 7/2001 |
| WO | 2003093950 | A2 | 11/2003 |

OTHER PUBLICATIONS

AudioTron Quick Start Guide, Version 1.0, Mar. 2001, 24 pages.
(Continued)

*Primary Examiner* — Harry S Hong
(74) *Attorney, Agent, or Firm* — Fortem IP LLP

(57) ABSTRACT

Turntable control systems are disclosed. A playback device can include an analog audio source component such as a turntable. The playback device is configured to cause playback of first audio based on analog audio signals generated by the analog audio source component. Based on an indication that analog audio signals are no longer being generated, the playback device requests, via a network interface, audio content from one or more remote computing devices. The request can include identifying related content based on the first audio. The playback device receives, via the network interface, second audio content from, and causes playback of second audio based on the second audio content.

20 Claims, 13 Drawing Sheets

Related U.S. Application Data

(60) Provisional application No. 63/202,783, filed on Jun. 24, 2021.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 12,010,492 | B2 * | 6/2024 | Wilberding | H04R 3/12 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2011/0002479 | A1 | 1/2011 | Camiel | |
| 2017/0026749 | A1 | 1/2017 | Rutledge | |
| 2022/0417660 | A1 * | 12/2022 | Wilberding | H04R 3/12 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Notice of Allowance mailed on Feb. 6, 2024, issued in connection with U.S. Appl. No. 17/808,169, filed Jun. 22, 2022, 9 pages.

Palm, Inc., "Handbook for the Palm VII Handheld," May 2000, 311 pages.

Presentations at WinHEC 2000, May 2000, 138 pages.

*Sonos, Inc.* v. *DM Holdings* , DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

SYSTEMS AND METHODS FOR COORDINATED PLAYBACK OF ANALOG AND DIGITAL MEDIA CONTENT

CROSS-REFERENCE TO RELATED APPLICATIONS

This application is a continuation of U.S. patent application Ser. No. 17/808,169, filed Jun. 22, 2022, now U.S. Pat. No. 12,010,492, which claims the benefit of priority to U.S. Patent Application No. 63/202,783, filed Jun. 24, 2021, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
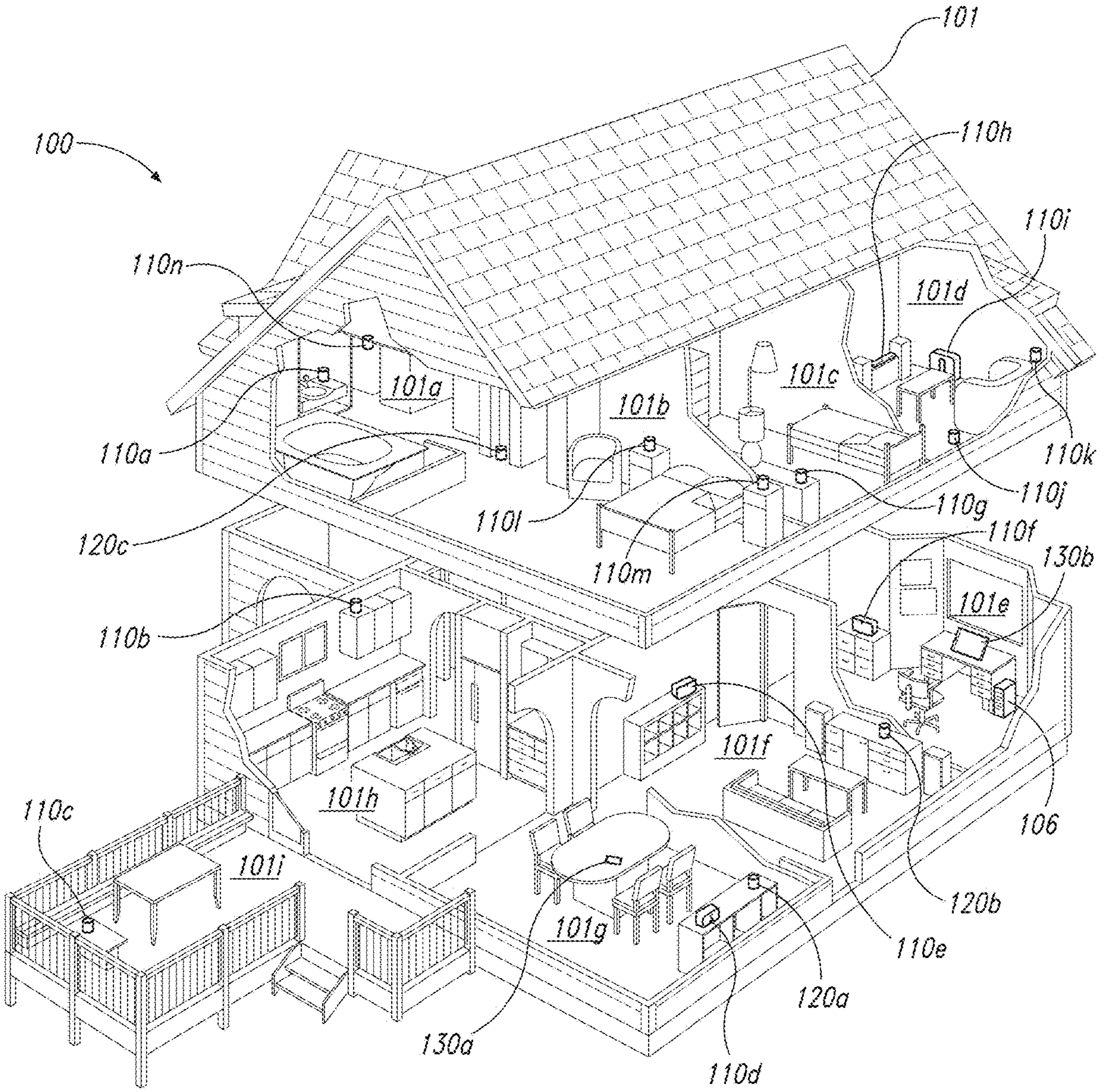
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Over the past several years, vinyl LPs have made a resurgence as a music playback format. Despite the format's objective technical deficiencies, many listeners enjoy the experience of listening to an LP. There are many solutions for integrating vinyl playback into a multi-room wireless platform, such as a Sonos system. These solutions, however, often lack intuitive controls and convenience features. Additionally, it can be cumbersome to coordinate between playback of vinyl or other analog content and playback of digital content streamed over a network interface. Several examples of the present technology can enhance the listening experience of playing back LPs or other analog media content, in particular when integrated with a smart media playback system.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a*-*n*), one or more network microphone devices ("NMDs"), 120 (identified individually as NMDs 120*a*-*c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio, visual content, or both audio and visual content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable. In some embodiments, a playback device includes a display component (e.g., a screen, projector, etc.) or is otherwise communicatively coupled to a display component for the playback of visual content.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples and examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
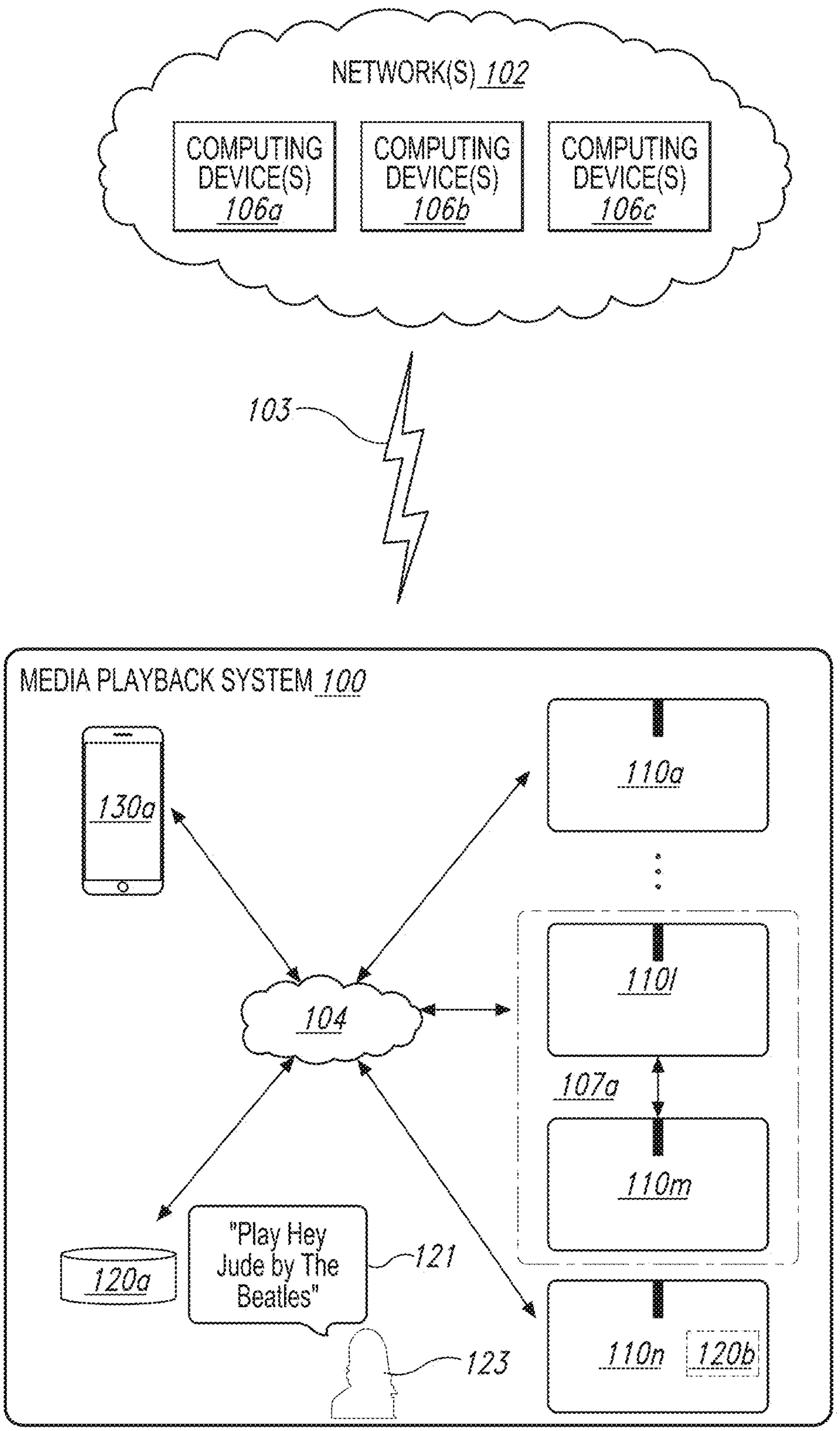
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for instance, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
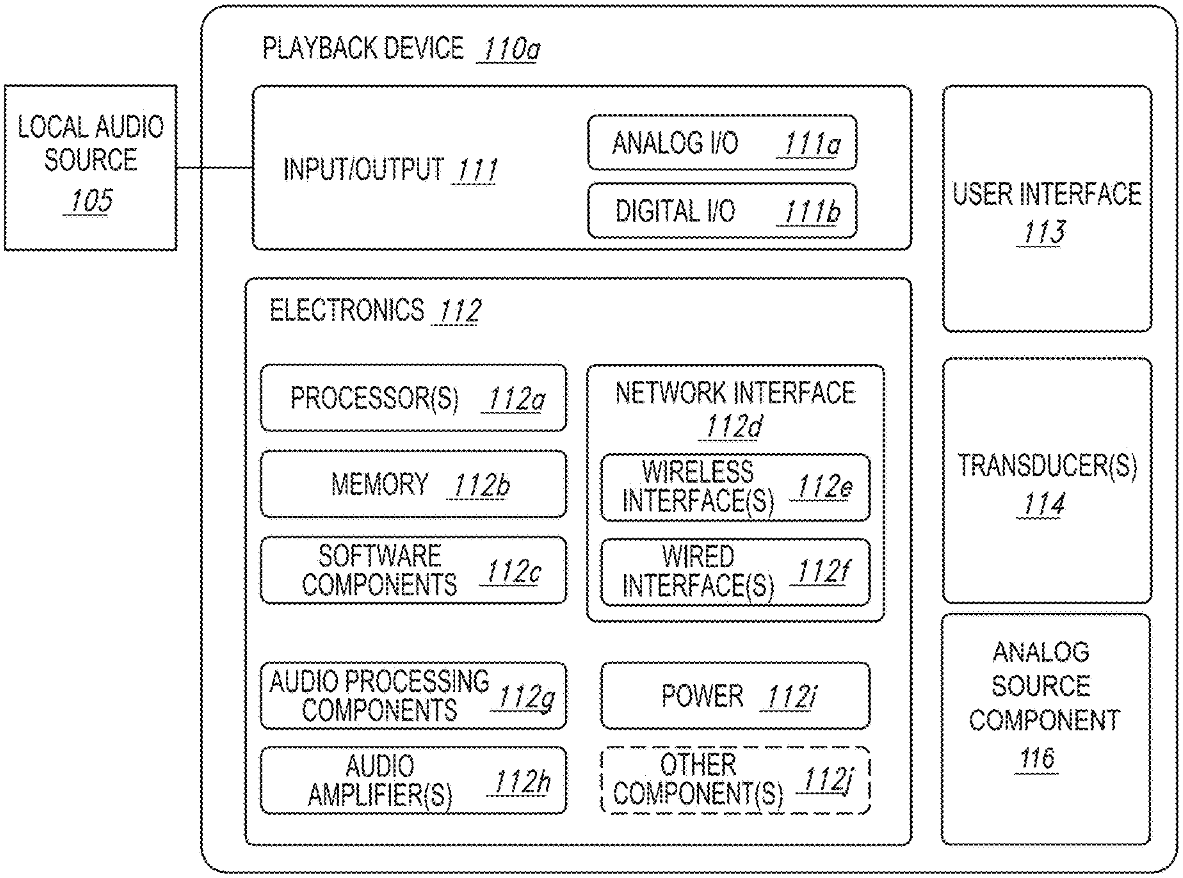
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

As shown in FIG. 1C, the playback device 110*a* can also include an analog source component 116. In various examples, the analog source component 116 can be integrated into the same housing or operably coupled to other components while itself positioned in a separate housing or enclosure. The analog source component 116 can be, for example, any suitable component or set of components configured to facilitate playback of analog media content such as vinyl records, magnetic tape cassettes, or other such analog content. In some examples, the analog source component 116 can take the form of a turntable-style record player (e.g., including a rotatable platter and a tonearm carrying a cartridge and needle). As described in more detail elsewhere herein, the analog source component 116 can be used to enable playback of physical, analog media content (e.g., vinyl LPs) while also providing additional functionality as compared to conventional analog playback devices.

Additionally, the playback device 110*a* can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for instance, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

The playback device 110*a* can also optionally include display components 112*k* that are configured to play back visual content (e.g., video), either accompanying audio playback or independently of any audio playback. In various examples, these display components 112*k* can include video display elements and associated electronics. Examples of suitable display elements include a display screen (e.g., liquid crystal display (LCD), light-emitting diode (LED) display, organic LED (OLED) display, etc.), a projector, a heads-up display, a wearable display (e.g., smart glasses, a smart watch, etc.), or any other suitable display technology that can play back visual content for viewing by one or more users. In some examples, the playback device 110*a* includes the display components 112*k* integrated within the same housing, for example in the case of a smart television or other such device. Additionally or alternatively, the playback device 110*a* can include display components 112*k* that are separate from but communicatively coupled to other elements of the playback device. For example, the playback device 110*a* can take the form of a soundbar that is communicatively coupled (e.g., via wired or wireless connection) to a television or other display component. In some examples, the playback device 110*a* can take the form of a dongle, set-top box, or other such discrete electronic component that can be communicatively coupled to a video display component such as a television, whether via a wired or wireless connection.

Figure 1D:
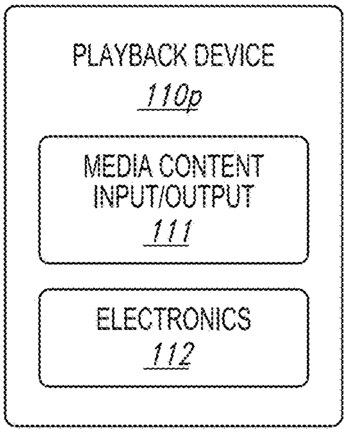
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for instance, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
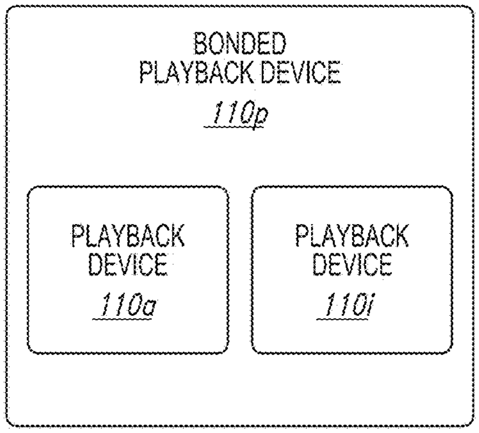
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
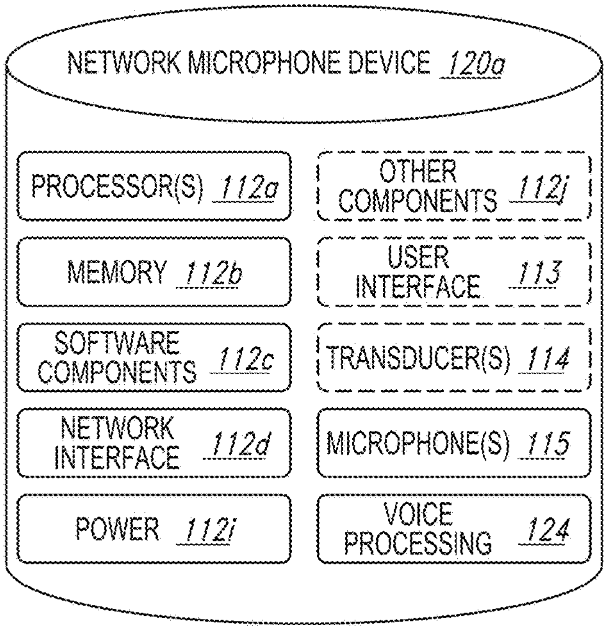
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
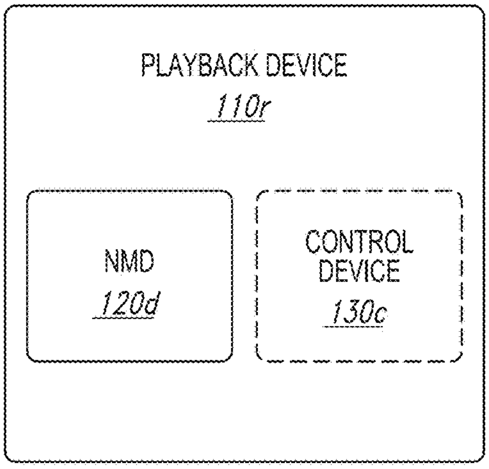
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
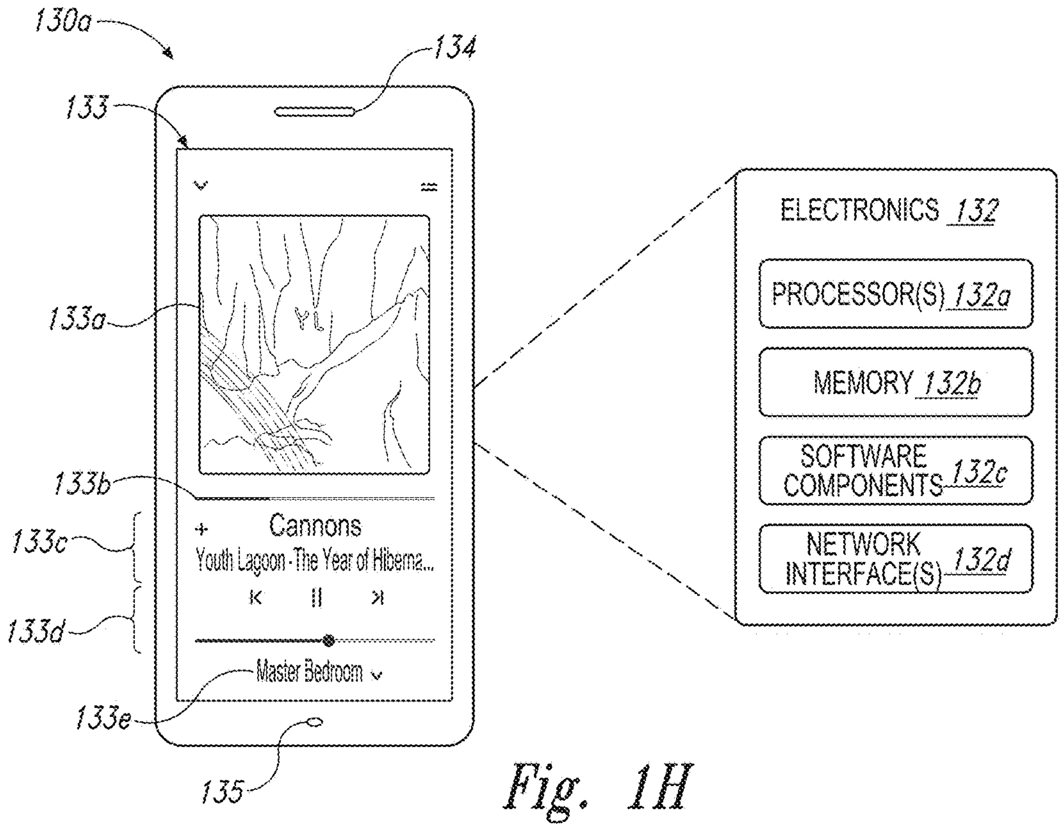
FIG. 1H is a partially schematic diagram of a control device.
Figure 1I:
FIGS. 1I through 1L show schematic diagrams of corresponding media playback system zones.
Figure 1J:
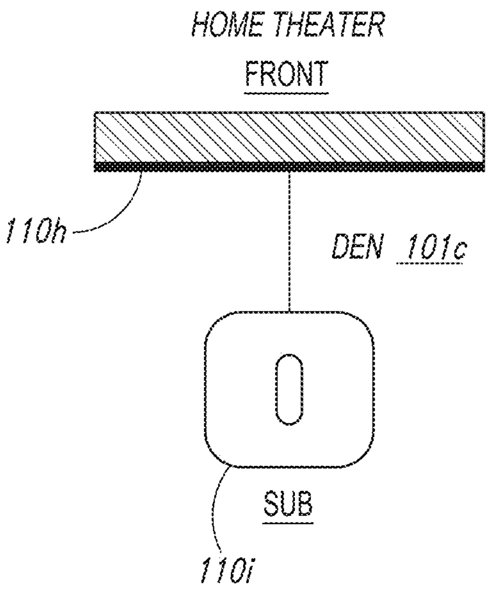
Figure 1K:
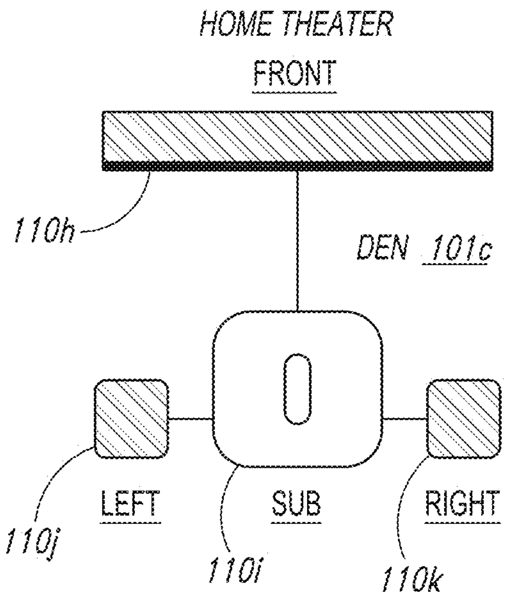
Figure 1L:
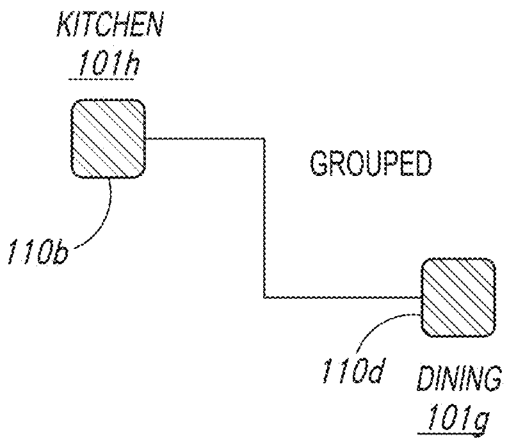
Figure 1M:
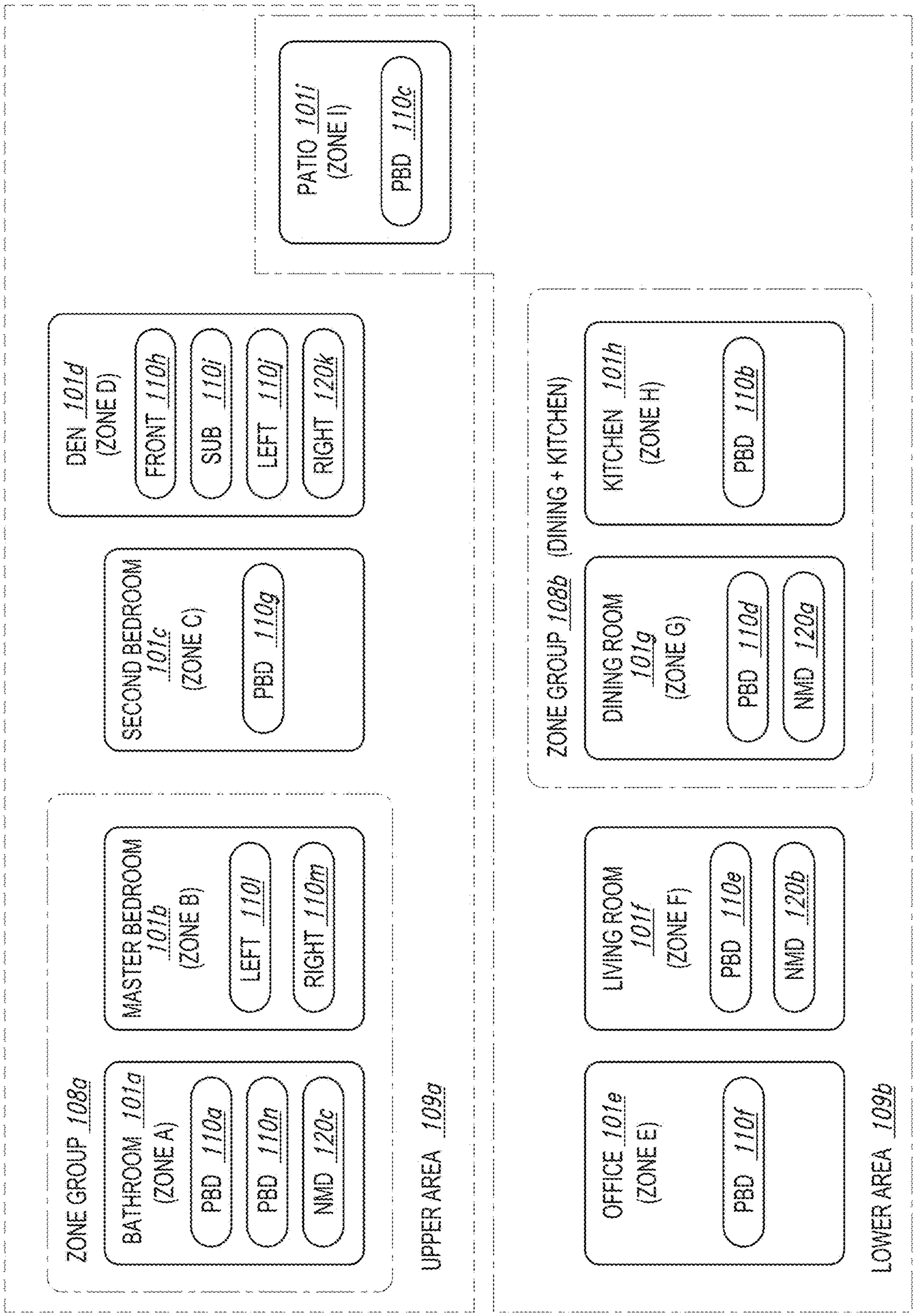
FIG. 1M shows a schematic diagram of media playback system areas.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

As described in more detail below, in various examples the control device 130 can be configured to control or otherwise interact with video playback via a playback device 110. In some examples, the control device 130 can be used to control video playback via the playback device (e.g., selecting video content or other such media content for playback). Additionally or alternatively, the control device 130 can be used to present supplemental content to the user during video playback via the playback device 110. For example, the user may initiate, via the control device 130, playback of a television show on a playback device 110 (e.g., a smart television). During playback of the television show, supplemental content (e.g., other recommended shows, cast list, friends' ratings, etc.) can be presented to the user via the interface 133 of the control device 130. In some examples, multiple control devices 130 can be used by the same or different users within the same environment to control the same playback device(s) 110. Moreover, the same or different supplemental content can be provided to those user(s) via the corresponding control devices 130.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Examples of Coordinated Playback of Analog and Digital Media Content

Figure 2:
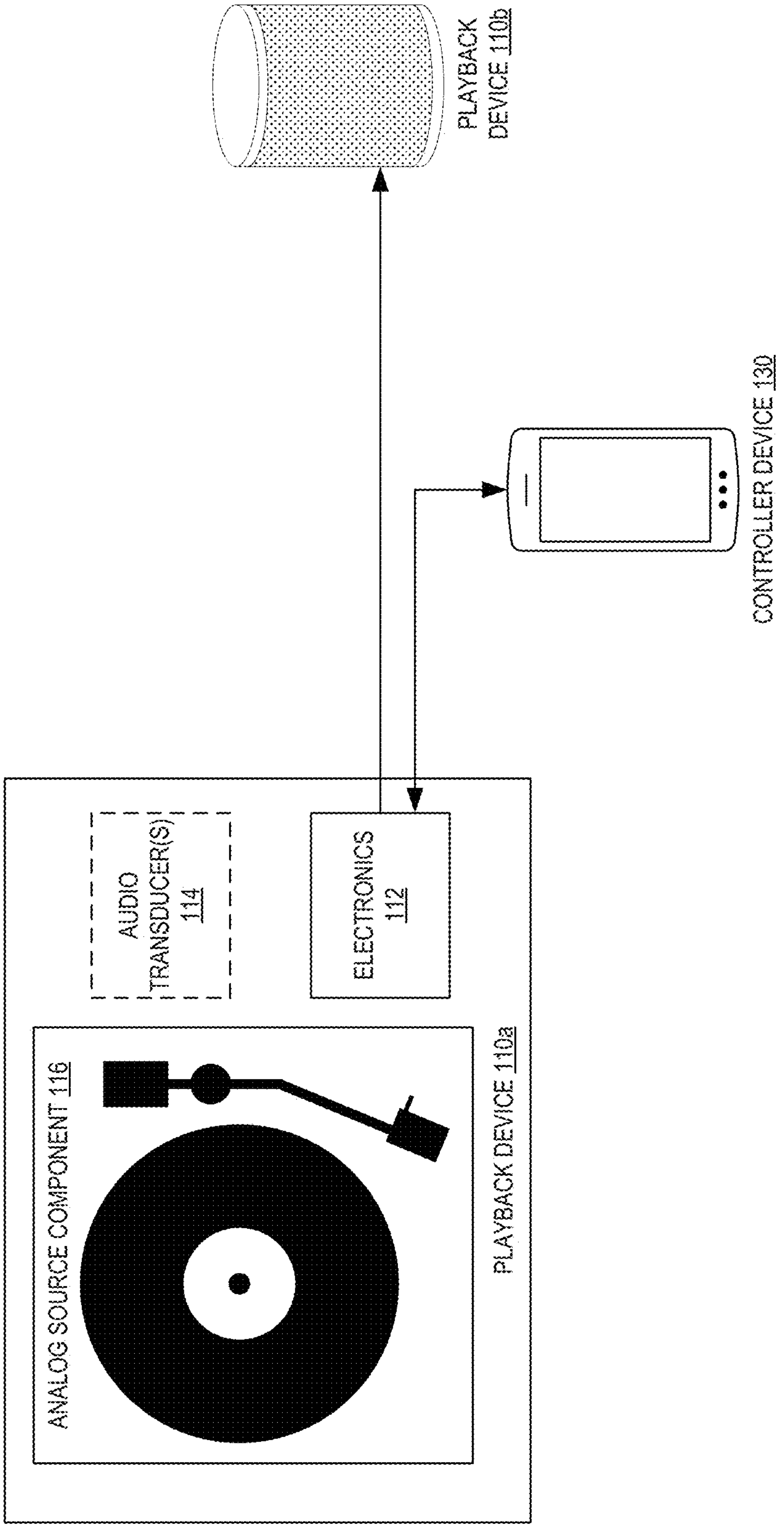
FIGS. 2-7 are schematic diagrams of media playback systems in accordance with examples of the disclosed technology.

FIGS. 2-7 illustrate example media playback systems for control of media playback that involves one or more analog components. As illustrated in FIG. 2, a first playback device 110*a* can include an analog source component 116 in addition to electronics 112 and, optionally, one or more audio transducers 114. The electronics 112 can include any of the electronics 112 described above with respect to FIG. 1C, such as one or more processors, memory, software components, audio processing components, audio amplifiers, power components, and/or a network interface. In some examples, the electronics 112 are configured to receive audio from the analog source components 116 (e.g., an analog signal obtained during playback of a vinyl LP or other analog media) and process the analog audio according to various configurations. This processing can include, for example, performing an analog-to-digital conversion, analyzing the analog audio signal, amplifying the audio for playback via transducers, etc. The electronics 112 can also include one or more processors configured to perform operations based on instructions stored in memory. These operations can include, for example, transmitting or receiving data via a network interface (e.g., a wired or wireless LAN or WAN connection) to other computing devices or playback devices. In at least some examples, the playback device 110*a* include one or more microphones (e.g., the playback device 110*a* can include a network microphone device or be integrated into a network microphone device).

Although several examples herein refer to an analog source component 116 in the form of a turntable-style record player, any suitable analog source component can be used (e.g., a magnetic tape reader, etc.). Additionally, while several examples illustrate the playback device 110*a* communicating (e.g., via a network interface) with a second playback device 110*b*, in some examples the second playback device 110*b* and the first playback device 110*a* can be integrated into the same housing or enclosure, thereby forming a single playback device. For example, in each case in which audio content is described as being transmitted from the first playback device 110*a* to the second playback device 110*b*, an alternative configuration involves playing back that audio content via the transducer(s) 114 of the first playback device 110*a*, in which case the second playback device 110*b* is optional. As also shown, the first playback device 110*a* and/or the second playback device 110*b* can be in communication with a controller device 130 (e.g., a smartphone, tablet, laptop, etc.).

With reference to FIG. 2, the playback device 110*a* can be configured to play back audio based on signals received via the analog source component 116. The audio can be played back via transducer(s) 114 of the playback device 110*a* or the audio can be transmitted (e.g., over a wired or wireless LAN or WAN connection) to the second playback device 110*b* for playback. In at least some instances, playback can involve converting the analog audio signals to digital signals for transmission and/or playback of the audio. Additionally or alternatively, the audio can be played back synchronously via the first playback device 110*a* and the second playback device 110*b*.

Operation of the first playback device 110*a*, including operation of the analog source component 116, can be controlled via the controller device 130. For example, a user can provide inputs via the controller device 130 that cause the analog source component to start or stop playback or perform other playback control operations. In the case of a record player, the user's input via the controller device 130 can cause the platter to begin or cease rotation, the tonearm to move into the desired position, or other such physical movement of the analog source component. In the case of a magnetic tape deck, the user's input via the controller device 130 can cause the magnetic tape to move with respect to the tape head (e.g., by movement of an internal pully) or to cease moving. This configuration can enable a user to enjoy audio from analog sources (e.g., vinyl records) while enabling the convenience of a smart media playback system, such as wireless control via a controller device 130 and interaction and coordination with discrete playback devices within the environment.

One shortfall of analog audio sources can be their relative brevity and the need for repeated user interactions to continue listening to music for extended periods of time. For example, a vinyl LP may be able to encode audio of approximately 25 minutes per side. Once a side is complete, the user has to return to the record player and flip the record over or place a new record on the player. While this ritual can be enjoyable to some, it may be desirable to continue playback of media content after analog playback has ceased (e.g., after playback of one side of a vinyl record has ended). To address these and other problems, in various embodiments a playback device can be configured to dynamically transition between playing back audio based on an analog source component and playing back audio from another source (e.g., digital audio received over a network interface).

Figure 3:
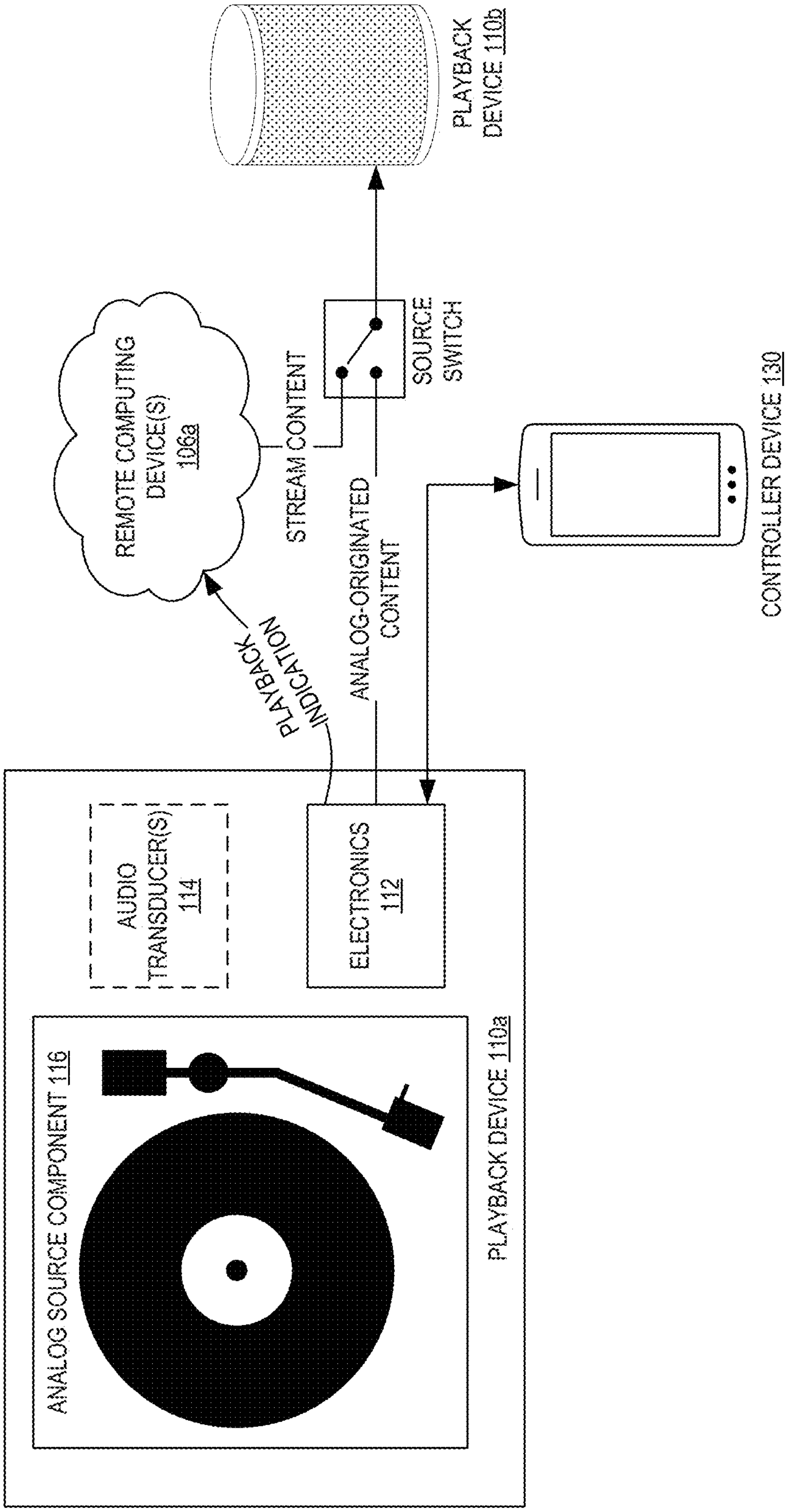

FIG. 3 illustrates an example arrangement that can provide these and other benefits. As shown in FIG. 3, the playback device 110*a* and/or the playback device 110*b* can be configured to play back audio from both an analog source component 116 as well as other sources, such as digital audio received over a network interface from one or more remote computing devices 106*a*. The remote computing devices 106*a* can include those associated with a media content service or other content source. In the example illustrated in FIG. 3, the second playback device 110*b* is configured to toggle between playing back analog-originated content received (e.g., over a wired or wireless connection) from the first playback device 110*a* and playing back content streamed from the remote computing device(s) 106*a*. This capability is illustrated schematically with a source switch. In various examples, such a switch can be software or hardware-controlled operations occurring within the second playback device 110*b*, rather than a physical switch external to the second playback device 110*b*.

In some cases, the first playback device 110*a* can transmit (e.g., via a network interface) a playback indication to the remote computing device(s) 106*a*. The playback indication can be an indication that playback of analog source content has ceased (e.g., that a record has reached its end) and/or that analog signals are no longer being generated. This indication can be based on evaluation of the analog signal itself (e.g., obtaining a signal-to-noise ratio or other parameter that can indicate a lack of audio content, where a signal-to-noise ratio below a predetermined threshold can indicate a lack of audio content, identifying a predetermined end-point marker embedded in the analog signal, audio fingerprinting that can identify when a particular piece of content is at its end, etc.). Additionally or alternatively, the indication can include other input parameters, such as a location or orientation of the tonearm or other physical measure of the analog source component, or any other element of the playback device that indicates analog audio signals are no longer being generated or that analog playback has ceased. Based on this indication, the remote computing device(s) 106*a* can initiate streaming content to the second playback device 110*b* for playback. For example, once analog playback has ceased (e.g., a vinyl record has reached its end), the first playback device 110*a* can automatically detect this cessation and cause the remote computing device(s) 106*a* to stream content for playback to the second playback device 110*b*. From the perspective of the user's experience, the streaming audio received from the remote computing device(s) 106*a* can seamlessly follow cessation of the analog-originated audio content.

In some instances, it can be beneficial to identify the content being played back via the analog source component 116. Based on this identification, the system can take other actions, such as providing relevant metadata to the user (e.g., for display via the controller device 130), by streaming related content following cessation of the analog audio content, recommending relevant content to the user, or other such actions.

Figure 4:
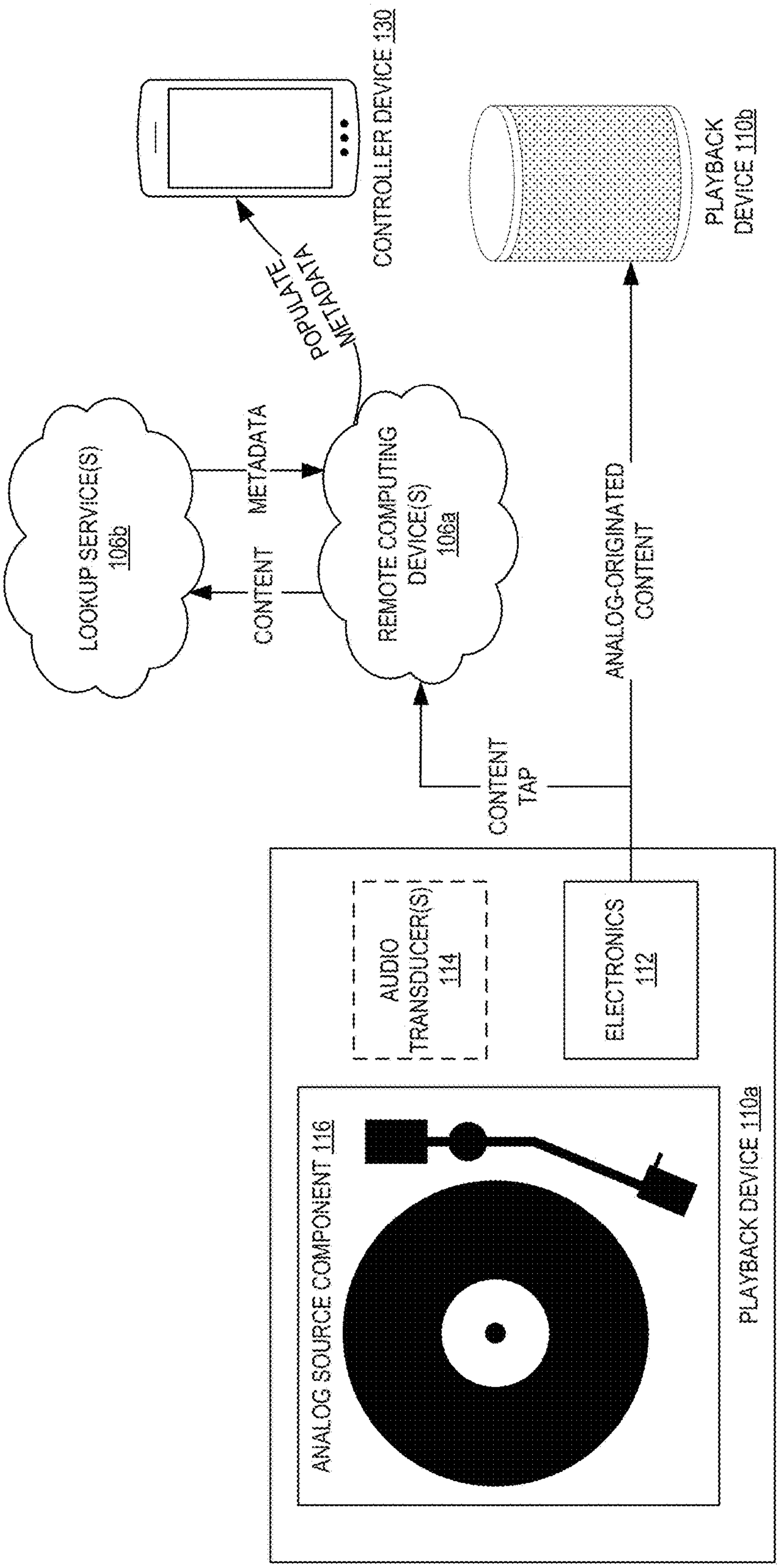

FIG. 4 illustrates an example system in which the analog audio content can be identified using one or more lookup services. As illustrated, analog-originated audio content can be obtained via the analog source component 116 and played back via the second playback device 110*b*. A content tap of this analog-originated audio content can be transmitted to one or more remote computing device(s) 106*a*. This content tap can take the form of a copy of the analog-originated audio content, or a parameter extracted from the analog-originated audio content.

The remote computing device(s) 106*a* can communicate with one or more lookup service(s) 106*b* to identify the particular content. For example, the content (or a parameter derived from the content) can be transmitted to the lookup service(s) 106*b*, which can return metadata. The metadata can take the form of an identification of the artist, album, track, associated album art, or any other such data associated with the particular identified content. The lookup service(s) 106*b* can use any suitable audio fingerprinting techniques or other automatic content recognition approaches known to one of ordinary skill in the art.

In some examples, as shown in FIG. 4, the metadata received from the lookup service(s) 106*b* can be used to populate metadata to be displayed via the user's controller device 130. For example, the artist, track, album, and/or album art can be displayed to the user via the controller device 130. This can allow the user to easily see the particular track and artist information even when the audio originates from an analog source such as a viny record.

In some examples, automatic content recognition can be performed on the analog-originated audio content without using remote cloud-based services. Additionally or alternatively, rather than identifying content based on analyzing the audio itself, the user may use the controller device to scan the album art or to scan an identifier associated with the analog content (e.g., a QR code or RFID embedded in a vinyl LP or cover). In yet another example, the audio may have embedded therein a particular identifier, such as an ultrasonic or near-ultrasonic sound signal that will generally be inaudible to the user but that can be analyzed to identify a particular piece of content.

Figure 5:
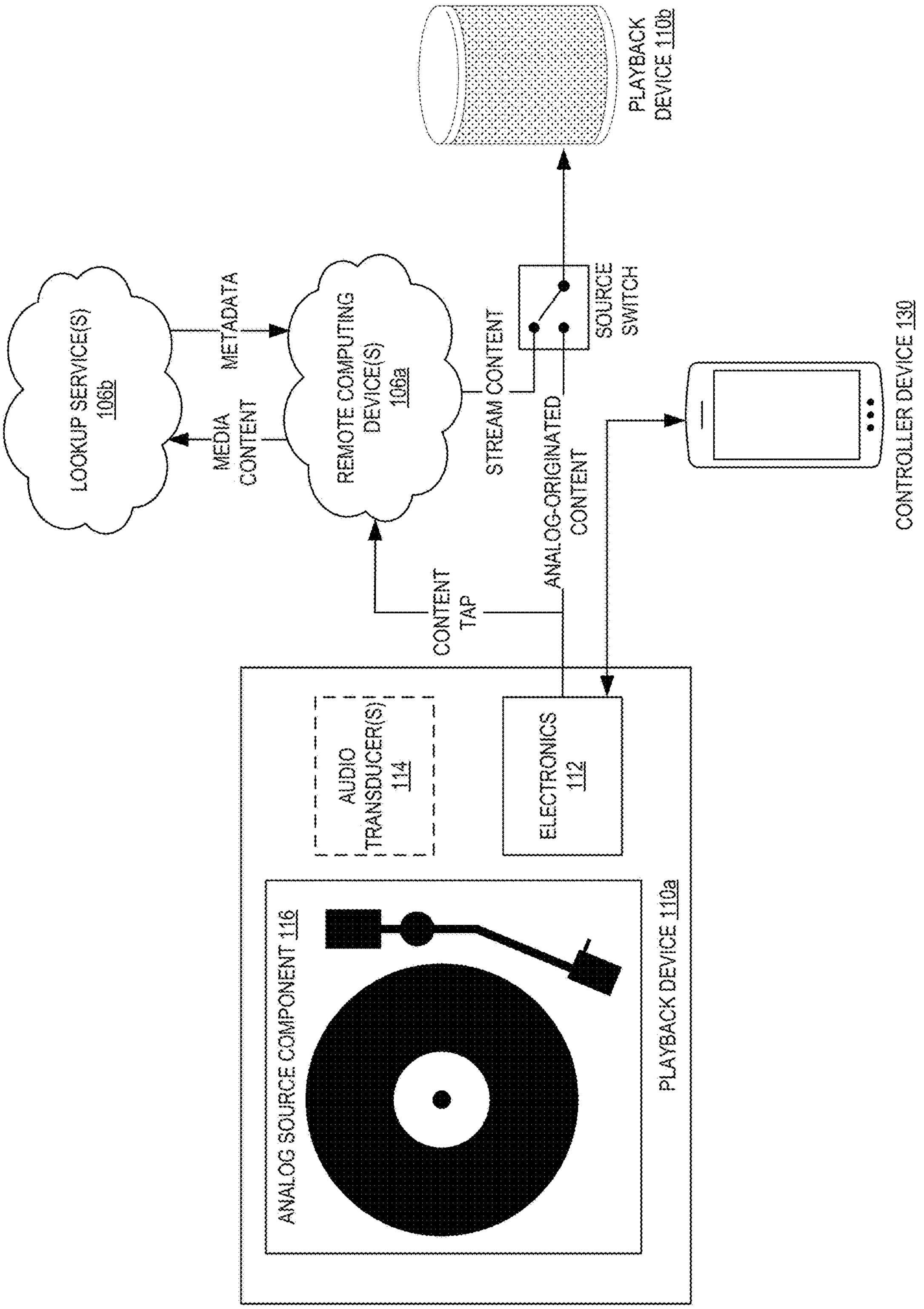

FIG. 5 illustrates another example system for playback of analog and digital media content. As described above with respect to FIG. 3, the second playback device 110*b* can toggle between playback of analog-originated audio content received via the analog source component 116 and playback of streaming audio content received from the remote computing device(s) 106*a*. In some examples, the second playback device 110*b* can initiate playback of the streaming content from the remote computing device(s) 106*a* following the end of the analog-originated content (e.g., the end of a vinyl LP). The particular content streamed from remote computing device(s) 106*a* for playback following playback of analog-originated audio content can be informed by the identification of the analog-originated audio content by the lookup service(s) 106*b* or otherwise. As shown in FIG. 5, the remote computing device(s) 106*a* can receive a content tap corresponding to the analog-originated audio content and obtain metadata (e.g., artist, track, album identification, etc.) using one or more lookup service(s) 106*b*. When streaming content is requested (e.g., based on indication that analog playback has ended, as described previously), the remote computing device(s) 106*a* can select content to stream to the second playback device 110*b* based on the metadata obtained from the lookup service(s). For example, once a vinyl record has ended, the streamed content transmitted to the second playback device 110*b* can include additional tracks related to that vinyl record. This can be, for example, tracks from the other side of the vinyl record, other tracks or albums by the same artist, a smart radio station based on that particular artist or album, other content from the same genre, decade, geographical association, etc. The user's experience can therefore be of an "infinite LP," in which selecting and playing a particular, physical vinyl record causes playback both of that vinyl record seamlessly followed by a stream of related audio content.

In some examples, the related audio content can be modified to add characteristics of vinyl to the digital stream, such that the streamed digital content is perceived to be more akin to the analog content that preceded it. The digital content can be modified to add spectral effects like filtering, saturation, low-end rumble, and/or dust/scratch crackle. Modification of the digital content can also be based on analysis of the analog-originated content. For example, the analog-originated audio content can be evaluated for its particular spectral signature and dynamics, and those parameters can be used to inform modification of the digital content so as to smooth over any audible transition from playback of the analog-originated audio content and the subsequent digital content stream. In some cases, such modification may initially seek to match the digital content to the characteristics of the analog-originated audio content (e.g., matching loudness, spectral signature, etc.), with these modifications decreasing gradually over time, optionally fading to a state of no modification. Alternatively, the digital content can be streamed with no such modifications at any time.

While automatically providing a stream of digital content for playback once analog playback has ceased, it can be beneficial to automatically switch back to playback of analog content once the user takes certain actions. For example, when a first side of a vinyl record has ended, the second playback device 110*b* can automatically initiate playback of related content that is streamed from the remote computing device(s) 106*b*. If the user flips over the record, however, the second playback device 110*b* can then automatically switch back to playing the analog-originated audio content. As such, the streamed digital content can serve as "intermission content" to be played back while a user switches from one analog audio source to another. In some examples, such transitions can be crossfaded to avoid a jarring audible contrast, either by default or as a result of a user selection or input.

Figure 6:
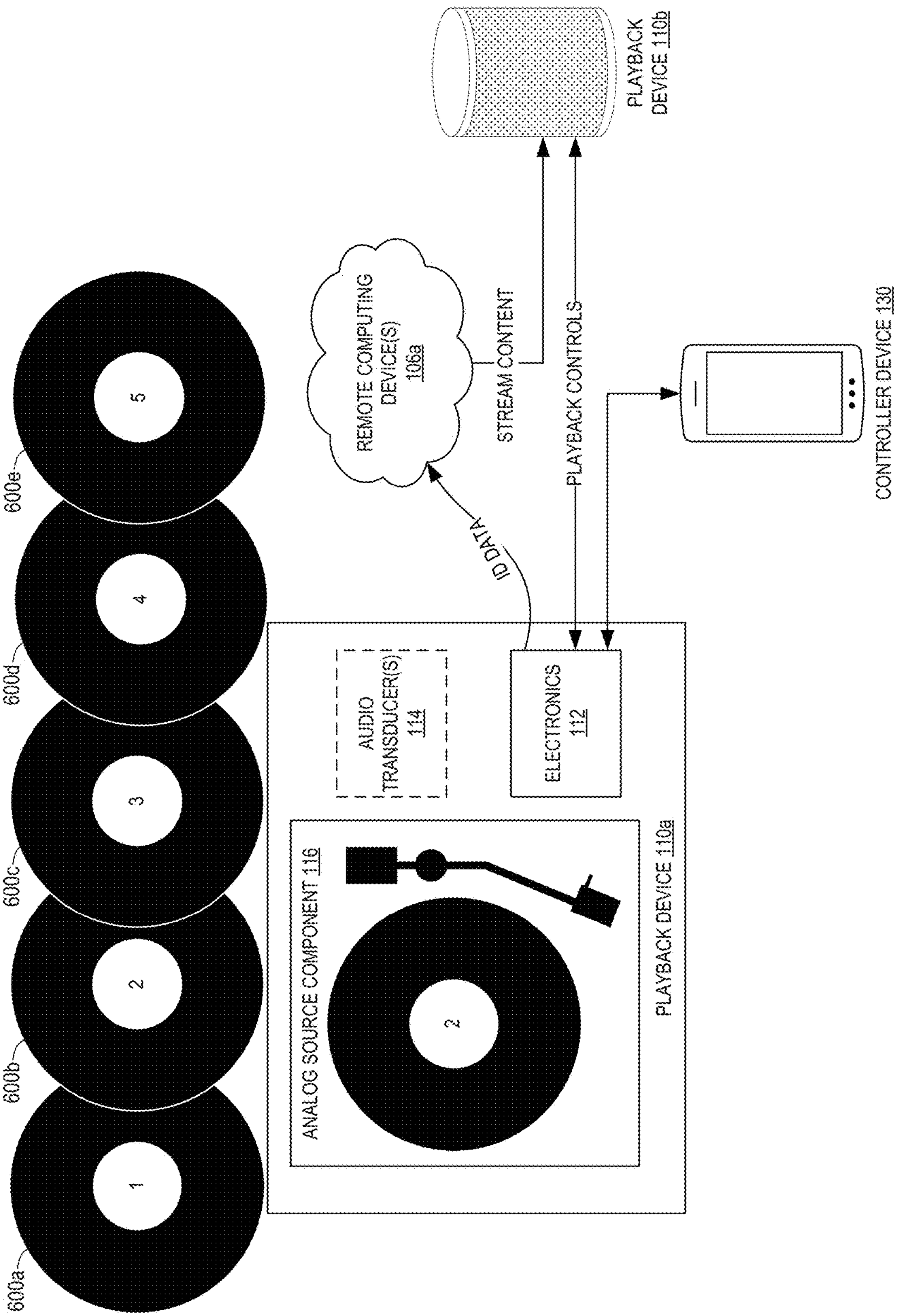
Figure 7:
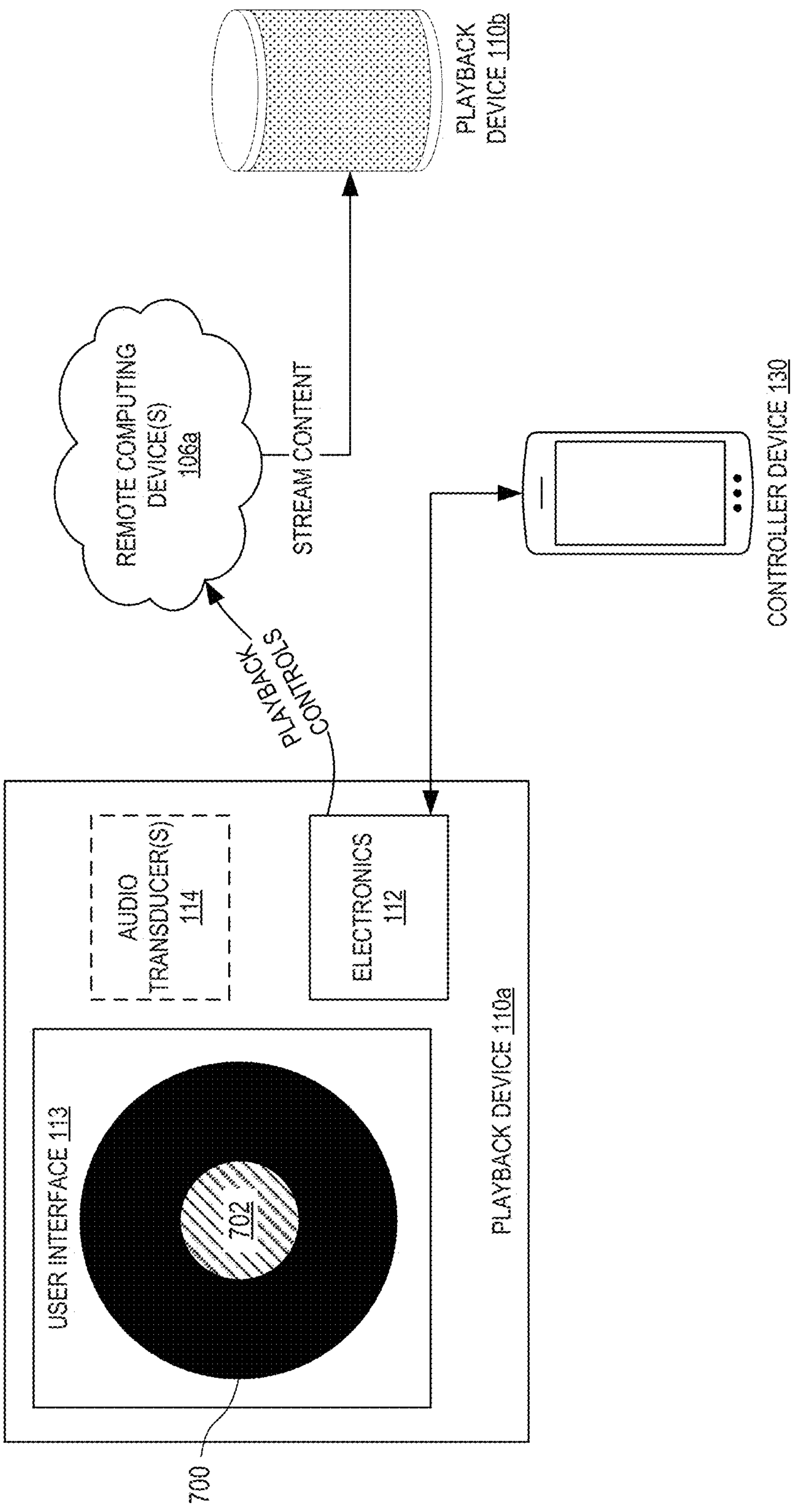

FIG. 6 illustrates another example system for playback of audio using an analog source component 116. However, unlike the systems described above with respect to FIGS. 2-5, the analog source component 116 is configured to extract an identifier from an analog source (e.g., a vinyl record), and this identifier can be used to request and play back corresponding digital content that is stored remotely. In this configuration, various arrangements of media content can be stored digitally while being represented and identified using physical, analog source objects such as vinyl records, tapes, etc.

For example, rather than a vinyl record that has audio encoded in grooves of the record, a vinyl record can have encoded therein an identifier (e.g., a numerical, alphabetic, or alphanumeric code or other such identifier) that can be used to retrieve digital content from remote computing device(s) 106*a*. This can be similar to so-called "digital vinyl" or vinyl emulators, in which two signals are embedded in a vinyl record. A first signal corresponds to a stereo tone in which the channels are out of phase by a known amount. The period of this tone can be translated to playback speed, and the phase to playback direction. A second signal corresponds to a unique timestamp at regular intervals on a given side of the vinyl record. The timestamp can be interpreted as an indicator for needle time position on a side. For a given digital vinyl manufacturer, these two signals are often identical for each digital vinyl record. In contrast, embodiments of the present technology relate to encoding a third signal onto a record, which may be in addition to the first two, and which can be an identifier that is decoded to match a unique container of digital content. In the arrangement shown in FIG. 6, a plurality of different analog content sources (shown here as records 600*a*-600*e*) can be provided, each having a different corresponding identifier embedded therein. When the analog source component 116 engages the particular analog source, the corresponding identifier is extracted. This identifier (shown as "ID data" in FIG. 6) is then transmitted to the remote computing device(s) 106*a*, which can then lookup the particular digital content corresponding to the identifier and stream that content to the second playback device 110*b* for playback. If the user places analog source (e.g., record 600*e*) on the player (analog source component 116), a different identifier can be extracted and used to request playback of different corresponding digital content stored via the remote computing device(s) 106*a*. If the user interacts with the second playback device 110*b* for playback control (e.g., pressing pause, skip, etc.,) those controls can be used to modify playback of the streamed content.

Using physical, analog objects to identify corresponding digital content can provide several advantages while maintaining the aesthetic and experiential aspects of interacting with physical media. For example, a user may create a "vinyl mixtape" by selecting their own desired arrangement of audio tracks. This arrangement can be stored at the remote computing device(s) 106 and associated with a particular identifier that corresponds to a vinyl record carried by the user. Since the vinyl record encodes only a particular identifier, and not the audio itself, the user can dynamically modify the arrangement of digital content corresponding to that identifier. As such, the particular audio played back in response to placing the vinyl record onto a record player can vary over time based on the user's selections. In some embodiments, the identifier can be used to retrieve supplemental content associated with a particular album or other audio content (e.g., extra artist interviews, exclusive tracks, etc.).

As noted previously, some users appreciate the aesthetic and experience of interacting with turntable-style playback devices while still desiring the convenience of smart playback devices that utilize digital audio. In the example shown in FIG. 7, the first playback device 110*a* includes a user interface 113 in the form of a turntable-style rotatable platter, plinth, or disc 700 that optionally includes a display 702 disposed in a central region. In this example, the visual appearance of the user interface mimics that of a record player, albeit without a tonearm or needle. However, in some examples, the user can interact with the interface 113 in a manner similar to those of a record player. For example, the disc 700 can be rotatable such that playback can be initiated by nudging the disc 700 to begin rotating, playback can be paused by touching the disc 700 with enough friction to stop rotation, etc. Additional options include skipping tracks by quickly rotating the disc 700 in a forward direction, or rewinding/repeating by quickly rotating the disc in a backward direction. Such an approach can provide the user with a tactile experience similar to those of a record player, while allowing access to the vastly larger library of available media accessible via the remote computing device(s) 106*a*. The screen 702 can provide feedback and optionally be touch-enabled to receive user inputs. In some embodiments, such a disc 700 or other turn-table style interface can be integrated into a controller device that is used to control operation of one or more discrete playback devices.

Figure 8:
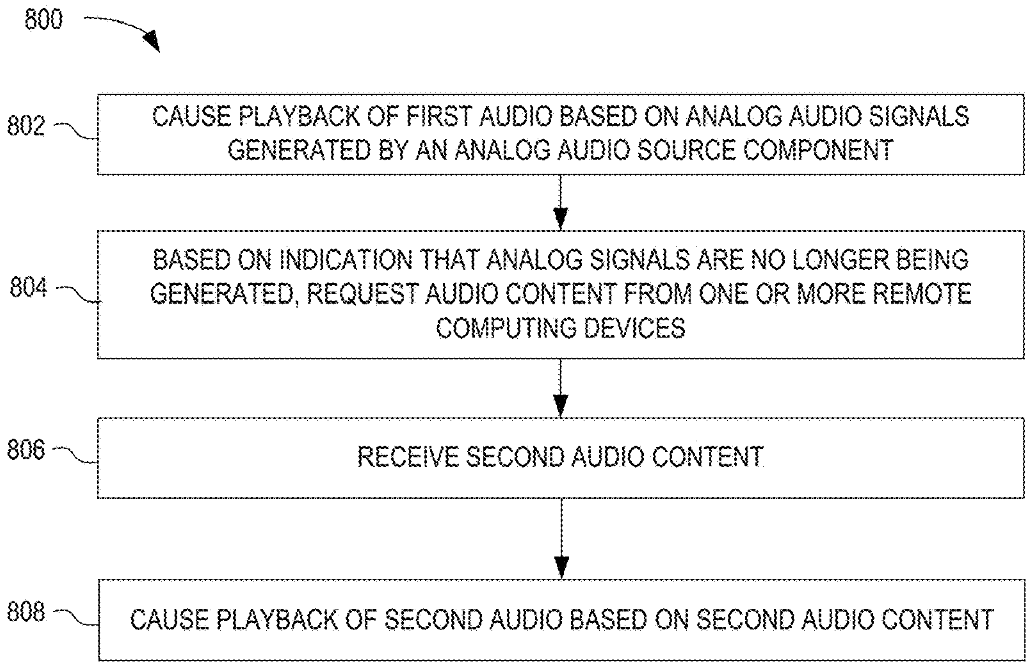
FIGS. 8 and 9 are flow diagrams illustrating example methods in accordance with the disclosed technology.
Figure 9:
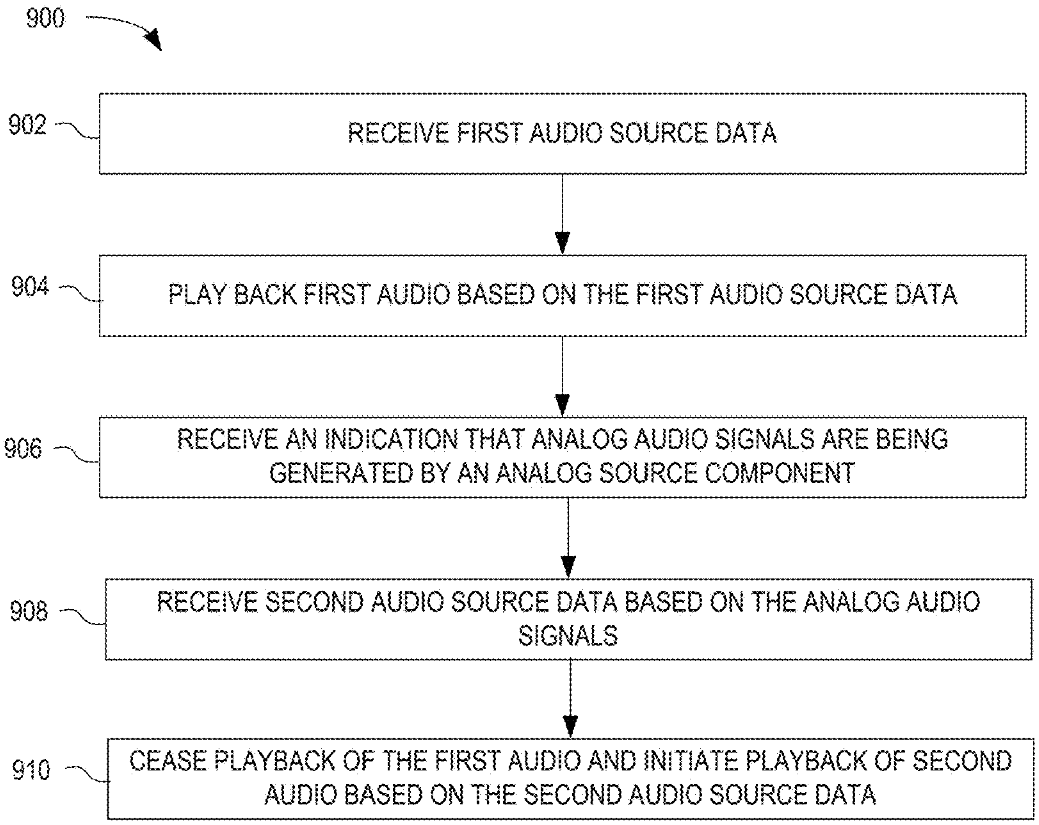

FIGS. 8 and 9 illustrate example methods in accordance with the present technology. The methods described herein can be implemented by any of the devices described herein, or any other devices now known or later developed. Various embodiments of the methods described herein include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods 800 and 900, and for other processes and methods disclosed herein, the flowcharts show functionality and operation of possible implementations of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIGS. 8-10 may represent circuitry that is wired to perform the specific logical functions in the process.

FIG. 8 illustrates an example method for managing playback of analog and digital audio content. The method 800 begins at block 802, which involves causing playback of first audio based on analog audio signals generated by an analog source component. For example, analog audio signals generated by a turntable-style record player can be used to play back audio content. In block 804, based on an indication that analog signals are no longer being generated by the analog audio source component, audio content is requested from one or more remote computing devices. For example, when a record is done playing, streaming audio content can be requested form one or more remote computing devices (e.g., a cloud-based media content service). The indication that analog signals are no longer being generated can be based on evaluation of the analog signal itself (e.g., obtaining a signal-to-noise ratio or other parameter that can indicate a lack of audio content) or other input parameter (e.g., a location of the tonearm, such as evaluation of the angle of the tonearm, or other physical measure of the analog source component or other element of the playback device that indicates analog audio signals are no longer being generated).

In block 806, second audio content is received. For example, if, in block 804, the playback device requests streaming audio content from a media content service, corresponding second audio content can be received via a network interface (e.g., over a local area network, a wide area network, etc.). In block 808, the second audio is played back based on the second audio content. In operation, this method enables a user to seamlessly transition from playing back analog audio content to playing back streaming digital audio content using the same playback device(s).

In various examples, the second audio received from the remote computing device(s) can be based, at least in part, on the particular analog audio content played back previously. For example, the analog audio content can be analyzed to identify the content and retrieve associated metadata (e.g., artist name, track, album, etc.). This metadata can be used to obtain related content for playback via digital streaming, such as other content by the same or related artists, etc. In addition, the analog audio content can be used as a seed or input to a generative media content engine which synthesizes novel media content. For example, analog audio content can be used as a seed or input for any of the generative media content engines described in commonly owned U.S. patent application Ser. No. 17/302,690, filed Mar. 10, 2021 and titled Playback of Generative Media Content, which is hereby incorporated by reference in its entirety.

FIG. 9 illustrates another example method for managing playback of analog and digital audio content. With reference to FIG. 9, the method 900 begins at block 902, which involves receiving first audio source data and, in block 904, playing back first audio based on the first audio source data. The first audio source data can take the form of, for example, digital audio content received over a network interface from one or more remote computing devices.

The method 900 continues in block 906 with receiving an indication that analog audio signals are being generated by an analog source component and, in block 908, with receiving second audio source data based on the analog audio signals. This indication can be based on, for example, physical movement of the analog source component (e.g., moving the tonearm, rotation of a platter, etc.). Additionally or alternatively, the indication can be based on analysis of a signal on a line-in from the analog source component (e.g., if the signal-to-noise ratio on the line-in exceeds a predetermined threshold, then the presence of audio signals is indicated).

In block 910, based on the indication that analog audio signals are being generated, playback of the first audio content (e.g., digital audio streamed from remote computing devices) is ceased, and playback of second audio content based on the second audio source data is initiated. In some examples, this transition can be crossfaded to smooth the change from one audio content to another. As noted above, the second audio source data can take the form of analog signals obtained from a record player or other analog source component. In operation, this method enables a user to seamlessly transition from playing back streamed digital content to playing back analog audio content using the same playback device(s).

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example embodiment or implementation of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A playback device comprising: an analog audio source component; a network interface; one or more processors; and data storage having instructions therein that, when executed by the one or more processors, cause the playback device to perform operations comprising: causing playback of first audio based on analog audio signals generated by the analog audio source component; based on an indication that analog audio signals are no longer being generated, requesting, via the network interface, audio content from one or more remote computing devices, wherein the requesting comprises identifying related content based on the first audio; receiving, via the network interface, second audio content; and causing playback of second audio based on the second audio content.

Example 2. A The playback device of any one of the preceding examples, wherein the indication that analog audio signals are no longer detected is based on a signal-to-noise ratio.

Example 3. A The playback device of any one of the preceding examples, wherein the indication that analog audio signals are no longer detected is based on embedded audio marker in the analog audio signals.

Example 4. The playback device of any one of the preceding examples, wherein the indication that analog audio signals are no longer detected is based on physical position of elements of the analog audio component (e.g., tonearm angle).

Example 5. The playback device of any one of the preceding examples, wherein the operations further comprise: after beginning playback the second audio, receiving an indication of second analog audio signals generated by the analog audio source component; ceasing playback of the second audio; and after ceasing playback of the second audio, causing playback of third audio based on the second analog audio signals generated by the analog audio source component.

Example 6. The playback device of any one of the preceding examples, further comprising: one or more audio transducers; and one or more amplifiers configured to drive the one or more audio transducers, wherein causing playback of the first audio comprises outputting the first audio via the one or more amplifiers and the one or more audio transducers.

Example 7. The playback device of any one of the preceding examples, wherein the playback device is a first playback device, and wherein causing playback of the first audio comprises transmitting, via the network interface, the first audio to a second playback device.

Example 8. The playback device of any one of the preceding examples, wherein the operations further comprise obtaining an automatic content recognition (ACR) determination based on the first audio.

Example 9. The playback device of any one of the preceding examples, wherein the operations further comprise obtaining metadata (e.g., album art, artist name, track name, etc.) based on the ACR determination.

Example 10. The playback device of any one of the preceding examples, wherein the operations further comprise causing the metadata to be displayed via a controller device.

Example 11. The playback device of any one of the preceding examples, wherein the obtaining the ACR determination comprises receiving the ACR determination from one or more remote computing devices.

Example 12. The playback device of any one of the preceding examples, wherein the operations further comprise: obtaining data based on analog audio signals generated by the analog audio source component; transmitting, via the network interface, a request for audio content associated with the data from one or more remote computing devices; receiving, via the network interface, third audio content for playback; and causing playback of third audio based on the third audio content.

Example 13. The playback device of any one of the preceding examples wherein the first data comprises an identifier associated with a playlist stored via one or more remote computing devices.

Example 14. A system comprising: an analog audio source component; a network interface; one or more processors; and data storage that, when executed by the one or more processors, cause the analog source component to perform operations comprising: receiving analog audio signals from the analog source component; generating digital audio signals based on the analog audio signals; transmitting, via the network interface, the digital audio signals for playback via a discrete playback device; receiving, from a controller device and via the network interface, an instruction to start or stop the analog audio source component; after receiving the instruction, mechanically starting or stopping operation of the analog audio source component.

Example 15. The system of any one of the preceding examples, wherein the analog audio source component is a turntable, magnetic tape deck, etc.

Example 16. The system of any one of the preceding examples, wherein mechanically starting or stopping comprises moving a tonearm of a turntable and/or stopping or starting rotation of a platter.

Example 17. A system comprising: an analog audio source component having a first network interface; a playback device communicatively coupled to the analog audio source component via the network interface, the playback device comprising: an audio transducer; a second network interface; one or more processors; and data storage having instructions therein that, when executed by the one or more processors, cause the playback device to perform operations comprising: receiving, via the second network interface, first audio source data; playing back, via the audio transducer, first audio based on the first audio source data; receiving, via the second network interface, an indication that analog audio signals are being generated by the analog audio source component; receiving, via the second network interface and from the analog source component, second audio source data based on the analog audio signals; and after receiving the indication, ceasing playback of the first audio and initiating playback of second audio based on the second audio source data.

Example 18. The system of any one of the preceding examples, wherein the operations further comprise: receiving, via the second network interface, a second indication that analog audio signals are no longer being generated by the analog audio source component; after receiving the second indication, ceasing playback of the second audio.

Example 19. The system of any one of the preceding examples, wherein the operations further comprise: after ceasing playback of the second audio, initiating playback of third audio based on third audio source data received via the second network interface.

Example 20. The system of any one of the preceding examples, wherein the first audio source data is received from one or more remote computing devices associated with a media content provider.

Example 21. A controller device comprising: a rotatable platter; a display component; a network interface; one or more processors; and data storage having instructions thereon that, when executed by the one or more processors, cause the controller device to perform operations comprising: detect movement of the rotatable platter; after detecting the movement, transmitting, via the network interface, instructions to cause a playback device to perform a command (e.g., play, stop, pause, skip, rewind).

Example 22. The controller device of any one of the preceding examples, further comprising a display component disposed in a central region of the rotatable platter.

Example 23. The controller device of any one of the preceding examples, wherein the display component is circular.

Example 24. The controller device of any one of the preceding examples, wherein the display component comprises a touch-sensitive display configured to receive user input via interaction with a graphical user interface (GUI).

Example 25. The controller device of any one of the preceding examples, wherein the movement comprises rotation of the rotatable platter.

Example 26. The controller device of any one of the preceding examples, wherein the particular command is based at least in part on one or more parameters of the movement (e.g., speed, direction, duration).

Example 27. A method performed by a playback device, the method comprising: the operations recited in any one of the preceding examples.

Example 28. A tangible, non-transitory, computer-readable medium storing instructions that, when executed by one or more processors of a playback device, cause the playback device to perform operations comprising: the operations recited in any one of the preceding examples.

The invention claimed is:

1. A playback device comprising:
- a network interface;
- one or more processors; and
- data storage having instructions therein that, when executed by the one or more processors, cause the playback device to perform operations comprising:
  - receiving, via an analog media source, audio data corresponding to analog audio signals;
  - causing playback of first audio based on the received audio data;
  - determining a trigger condition associated with analog audio signals no longer being received;
  - after determining the trigger condition, obtaining, synthetic novel audio content that is based at least in part on the analog audio signals; and
  - causing playback of second audio based on the synthetic novel audio content.

2. The playback device of claim 1, wherein obtaining the synthetic novel audio content comprises:
- transmitting, via the network interface and to one or more remote computing devices, data indicative of the analog audio signals, wherein the one or more remote computing devices store a generative media content engine; and
- receiving, via the network interface and from the one or more remote computing devices, the synthetic novel audio content.

3. The playback device of claim 2, wherein the data indicative of the analog audio signals is an input to the generative media content engine for production of the synthetic novel audio content.

4. The playback device of claim 1, wherein obtaining the synthetic novel audio content comprises:
- transmitting, via the network interface and to one or more remote computing devices, metadata associated with the analog audio signals, wherein the one or more remote computing devices store a generative media content engine; and
- receiving, via the network interface and from the one or more remote computing devices, the synthetic novel audio content.

5. The playback device of claim 4, wherein the metadata comprises an identification of an artist, track, or album of the analog audio signals.

6. The playback device of claim 4, wherein the metadata associated with the analog audio signals is an input to the generative media content engine for production of the synthetic novel audio content.

7. The playback device of claim 1, wherein a generative media content engine is stored locally in the data storage, and wherein obtaining the synthetic novel audio content comprises locally producing the synthetic novel audio content via the generative media content engine.

8. A method performed by a playback device, the method comprising:
- receiving, via an analog media source, audio data corresponding to analog audio signals causing playback of first audio based on the received audio data;
- determining a trigger condition associated with analog audio signals no longer being received;
- after determining the trigger condition, obtaining, via synthetic novel audio content that is based at least in part on the analog audio signals; and
- causing playback of second audio based on the synthetic novel audio content.

9. The method of claim 8, wherein obtaining the synthetic novel audio content comprises:
transmitting, via a network interface of the playback device and to one or more remote computing devices, data indicative of the analog audio signals, wherein the one or more remote computing devices store a generative media content engine; and
receiving, via the network interface and from the one or more remote computing devices, the synthetic novel audio content.

10. The method of claim 9, wherein the data indicative of the analog audio signals is an input to the generative media content engine for production of the synthetic novel audio content.

11. The method of claim 8, wherein obtaining the synthetic novel audio content comprises:
transmitting, via a network interface of the playback device and to one or more remote computing devices, metadata associated with the analog audio signals, wherein the one or more remote computing devices store a generative media content engine; and
receiving, via the network interface and from the one or more remote computing devices, the synthetic novel audio content.

12. The method of claim 11, wherein the metadata comprises an identification of an artist, track, or album of the analog audio signals.

13. The method of claim 11, wherein the metadata associated with the analog audio signals is an input to the generative media content engine for production of the synthetic novel audio content.

14. The method of claim 8, wherein a generative media content engine is stored locally on the playback device, and wherein obtaining the synthetic novel audio content comprises locally producing the synthetic novel audio content via the generative media content engine.

15. One or more tangible, non-transitory, computer-readable media storing instructions that, when executed by one or more processors of a playback device, cause the playback device to perform operations comprising:
receiving, via an analog media source, audio data corresponding to analog audio signals;
causing playback of first audio based on the received audio data;
determining a trigger condition associated with analog audio signals no longer being received;
after determining the trigger condition, obtaining synthetic novel audio content that is based at least in part on the analog audio signals; and
causing playback of second audio based on the synthetic novel audio content.

16. The one or more computer-readable media of claim 15, wherein obtaining the synthetic novel audio content comprises:
transmitting, via a network interface of the playback device and to one or more remote computing devices, data indicative of the analog audio signals, wherein the one or more remote computing devices store a generative media content engine; and
receiving, via the network interface and from the one or more remote computing devices, the synthetic novel audio content.

17. The one or more computer-readable media of claim 16, wherein the data indicative of the analog audio signals is an input to the generative media content engine for production of the synthetic novel audio content.

18. The one or more computer-readable media of claim 15, wherein obtaining the synthetic novel audio content comprises:
transmitting, via a network interface of the playback device and to one or more remote computing devices, metadata associated with the analog audio signals, wherein the one or more remote computing devices store a generative media content engine; and
receiving, via the network interface and from the one or more remote computing devices, the synthetic novel audio content.

19. The one or more computer-readable media of claim 18, wherein the metadata associated with the analog audio signals is an input to the generative media content engine for production of the synthetic novel audio content.

20. The one or more computer-readable media of claim 15, wherein a generative media content engine is stored locally on the playback device, and wherein obtaining the synthetic novel audio content comprises locally producing the synthetic novel audio content via the generative media content engine.

* * * * *